United States Patent
Wu (10) Patent No.: US 6,219,378 B1
(45) Date of Patent: *Apr. 17, 2001

(54) DIGITAL SUBSCRIBER LINE MODEM INITIALIZATION

(75) Inventor: Song Wu, Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,256

(22) Filed: Dec. 19, 1997

Related U.S. Application Data (60) Provisional application No. 60/059,182, filed on Sep. 17, 1997.

(51) Int. Cl.[7] .............................. H03H 7/30; H03H 7/40; H03K 5/159
(52) U.S. Cl. ......................... 375/231; 375/222; 370/484
(58) Field of Search .................................. 375/222, 231, 375/260; 370/484, 210

(56) References Cited

U.S. PATENT DOCUMENTS

| | | | |
|---|---|---|---|
| 5,285,474 | * | 2/1994 | Chow et al. .......................... 375/231 |
| 5,910,970 | * | 6/1999 | Lu ........................................ 375/377 |
| 6,028,891 | * | 2/2000 | Ribner et al. ........................ 375/222 |

FOREIGN PATENT DOCUMENTS 0 806 852 A2   11/1997   (EP) .

OTHER PUBLICATIONS

"A Discrete Multitone Transceiver System for HDSL Applications," Chow, et al., *IEEE Journal on Selected Areas In Communications,* vol. 9, No. 6, Aug. 1991, pp. 895–908.

"Multicarrier Modulation for Data Transmission: An Idea Whose Time Has Come," John A. C. Bingham, *IEEE Communications Magazine,* May 1990, pp. 5–14.

* cited by examiner

Primary Examiner—Chi Pham
Assistant Examiner—Phuong Phu
(74) Attorney, Agent, or Firm—J. Dennis Moore; Wade James Brady, III; Frederick J. Telecky, Jr.

(57) ABSTRACT

A method of initializing the operation of a remote modem (10) and central office modem ($20_k$) for asymmetric subscriber line modem communications over a twisted pair wire facility (TWP), using discrete multi-tone technology, is disclosed. The initialization process begins with the remote modem (10) issuing an initialization request, in response to which the central office modem ($20_k$) issues an acknowledgment. The remote modem (10) includes a low-cost analog filter (21) for separating upstream communication echoes from downstream data. This analog filter (21) increases the duration of impulse response over the channel, and thus requires time-domain equalization (TEQ) process (31) performed by the remote modem (10) to filter relatively long circular prefixes, so that intersymbol interference is eliminated. Transceiver training processes (62R, 62C) are carried out, through the generation of a pseudo-random sequence of frames by the central office modem ($20_k$), the receipt of which is used by the remote modem (10) to establish its TEQ coefficients and taps in an optimal manner.

18 Claims, 5 Drawing Sheets

DIGITAL SUBSCRIBER LINE MODEM INITIALIZATION

CROSS-REFERENCE TO RELATED APPLICATIONS

This application claims the benefit, under 35 U.S.C. §119(e)(1), of U.S. Provisional Application Ser. No. 60/059,182, filed Sep. 17, 1997, and incorporated herein by this reference.

STATEMENT REGARDING FEDERALLY SPONSORED RESEARCH OR DEVELOPMENT

Not applicable.

BACKGROUND OF THE INVENTION

This invention is in the field of high-speed modem telecommunications, and is more specifically directed to the initialization of communications between high-speed modems.

The high-speed exchange of digital information between remotely located computers is now a pervasive part of modem computing in many contexts, including business, educational, and personal computer uses. It is contemplated that current and future applications of high speed data communications will continue the demand for systems and services in this field. For example, video on demand (VOD) is one area which has for some time driven the advancement of technology in the area of digital information exchanges. More recently, the rapid increase in use and popularity of the Global Internet (hereinafter, the "Internet") has further motivated research and preliminary development of systems directed to advanced communication of information between remotely located computers, particularly in effecting higher bit-rates using existing infrastructure.

One type of technology arising from the above and continuing to evolve is referred to in the art as digital subscriber line ("DSL"). DSL refers generically to a public network technology that delivers relatively high bandwidth over conventional telephone company copper wiring at limited distances. DSL has been further separated into several different categories of technologies, according to a particular expected data transfer rate, the type and length of medium over which data are communicated, and schemes for encoding and decoding the communicated data.

In each case, a DSL system may be considered as a pair of communicating modems, one of which is located at a customer site, such as a home or office computer, and the other of which is located at a network controller site, typically a telephone company central office. Within the telephone company system, this modem is connected to communicate with some type of network, often referred to as a backbone network, which is in communication with other communication paths by way of equipment such as routers or digital subscriber line access multiplexers (DSLAMs). Through these devices, the backbone network may further communicate with dedicated information sources and with the Internet. As a result, information accessible to the backbone network, such as Internet information, may be communicated between the central office DSL modem and a customer site having its own compatible DSL modem.

Within this general system, it is also anticipated that data rates between DSL modems may be far greater than current voice modem rates. Indeed, current DSL systems being tested or projected range in rates on the order of 500 Kbps to 18 Mbps or higher. According to certain conventional techniques, the data communication rates are asymmetrical. Typically, the higher rate is provided for so-called downstream communications, that is from the central office to the customer site, with upstream communication from the customer site to the central office at a rate considerably lower than the downstream rate. Most DSL technologies also do not use the whole bandwidth of the twisted pair, reserving a relatively low bandwidth channel for voice communication, so that voice and data communications may be simultaneously carried out over the same line.

The most publicized DSL technology currently under development is referred to as Asymmetric Digital Subscriber Line, or "ADSL," and corresponds to ANSI standard T1.413. Despite the existence of this standard, debate and competition is still present in the art, particularly as to whether devices complying with the standard provide promise for future wide scale use and whether the standard requires revision. For example, while the standard currently contemplates a modulation technology called Discrete Multitone (DMT) for the transmission of high speed data, an alternative data transmission technique referred to as carrierless amplitude/phase modulation (CAP) has also recently gained favor in the field. In any event, given the current state of the art, it is contemplated that ADSL systems will communicate data over a single copper twisted pair at downstream rates on the order of 1.5 Mbps to 9 Mbps, and with an upstream bandwidth will range from 16 kbps to 640 kbps. Along with Internet access, telephone companies are contemplating delivering remote LAN access and VOD services via ADSL.

Other DSL technologies being developed include High-Bit-Rate Digital Subscriber Line ("HDSL"), Single-Line Digital Subscriber Line ("SDSL"), and Very-high-data-rate Digital Subscriber Line ("VDSL"). HDSL, unlike ADSL as described above, has a symmetric data transfer rate, communicating at the same speed in both upstream and downstream directions. Current perceived speeds are on the order of 1.544 Mbps of bandwidth, but require two copper twisted pairs. However, the operating range of HDSL is more limited than that of ADSL, and is currently considered to be effective at distances of approximately 12,000 feet or less, beyond which signal repeaters are required. SDSL delivers comparable symmetric data transfer speed as HDSL, but achieves these results with a single copper twisted pair which limits the range of an SDSL system to approximately 10,000 feet. Lastly, VDSL provides asymmetric data transfer rates at much higher speeds, such as on the order of 13 Mbps to 52 Mbps downstream, and 1.5 Mbps to 2.3 Mbps upstream, but only over a maximum range of 1,000 to 4,500 feet.

Of course, in addition to performance considerations and to the distance over which DSL communications may be carried by conventional twisted-pair infrastructure, the cost of the modem hardware is also a significant factor in the selection of a communications technology. It is therefore contemplated that a lower data rate technology may provide high-speed data communications, with downstream data rates exceeding 1 Mbps, over existing twisted-pair networks and at cost that is competitive with conventional non-DSL modems, such as 56 k, V.34, and ISDN modems.

By way of further background, data rate negotiation methods are utilized in connection with conventional modems, to establish the highest data rate at which communications may be carried out over a channel. For example, most modern analog modems execute a data rate negotiation with a dial-up host upon connection, to determine the highest common data rate that may be used over the current telephone connection.

BRIEF SUMMARY OF THE INVENTION

It is an object of the present invention to provide a method and system for data communications in which a remote and central office modem may initialize communications in order to maximize the available data communication rates and accuracy.

It is a further object of the present invention to provide such a method and system in which such initialization may determine the bit rate capacity at which each of multiple subcarrier channels within both an upstream and a downstream spectrum may reliably communicate data.

It is a further object of the present invention to provide such a method and system in which such initialization involves the exchange of information between modems that is also directed to the setting of equalizer filters.

It is a further object of the present invention to provide such a method and system that is particularly suited in modems that may be realized in a small number of integrated circuit devices.

Other objects and advantages of the present invention will be apparent to those of ordinary skill in the art having reference to the following specification together with its drawings.

The present invention may be implemented into a modem system, and into a method of operating the same to initialize the operating conditions of the modem-to-modem session. The modems include analog filters at the analog front end which, while reducing the modem cost, also significantly increase the channel impulse response and thus necessitate relatively long circular prefixes to eliminate intersymbol interference. According to the present invention, following initial activation of the session by way of hand-shaking, training of the central office and remote modems is carried out in order to establish synchronization of the modems with one another, and also the parameters by way of which a time domain equalizer and a frequency domain equalizer are set in each modem. Training of the time domain equalizer is effected by the communication of a pseudo-random sequence from the transmitting modem, followed by the receiving modem solving a set of linear equations in order to filter the circular prefix from the signal. Measurement of the signal-to-noise ratio over each subcarrier channel is then effected, followed by exchange of bit loading information for each subchannel between the two modems.

DETAILED DESCRIPTION OF THE INVENTION

Figure 1:
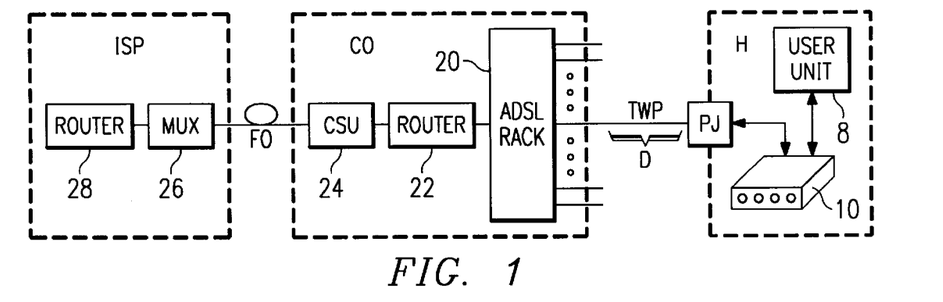
FIG. 1 is an electrical diagram, in block form, of a digital subscriber line communication system into which the preferred embodiment of the invention may be implemented.

Referring first to FIG. 1, a telecommunication system into which the preferred embodiment of the present invention may be implemented will now be described in detail. According to this system, a user in a home or office environment (shown as user environment H) operates user unit 8, such as a personal computer or workstation, or which alternatively may be an entertainment unit in the video-on-demand (VOD) context. User unit 8 is connected to remote modem 10, the construction and operation of which will be described in detail hereinbelow, which is connected to twisted-pair wire facility TWP by way of a conventional phone jack PJ. One or more telephones (not shown) may also be connected into twisted pair wire facility TWP by way of phone jack PJ, such that voice communications may alternatively or additionally be communicated over twisted pair wire facility TWP.

Twisted pair wire facility TWP is implemented by way of conventional telephone wiring between a home or office user environment H and central office CO. As is fundamental in the communications field, central office CO is a location that is operated by a telephone carrier or service provider, and which provides switching of telephone calls, both incoming and outgoing, relative to the user environments H that it services. Central office CO is typically provided relatively close to its associated user environments H; in this example, for purposes of achieving high-speed data communications according to the ADSL or MDSL protocols to be described herein, distance d between central office CO and user environment H is preferably no greater than 18,000 feet, due to the attenuation of high speed communications over conventional twisted pair wire facility TWP. Alternatively, if user environment H is more than this specified distance from central office CO, one or more signal repeaters (not shown) may be included within twisted pair wire facility TWP to boost the signals along their respective paths, particularly from central office CO to user environment H.

According to this embodiment of the invention, central office CO includes ADSL modem rack 20, which includes multiple ones of central office modems 20$_k$, one of which is in communication (either directly, or through a switch) with twisted pair wire facility TWP associated with user environment H. The construction and operation of each of modems 20$_k$ will be described in further detail hereinbelow.

ADSL rack 20 is connected to a conventional router 22, and in turn via channel service unit (CSU) 24 to Internet service provider ISP via fiber optic line FO. Internet service provider ISP may be at a separate location, operated separately from central office CO or, if the telephone service provider that operates central office CO also provides Internet access, Internet service provider ISP may simply be a separate function within central office CO or elsewhere in its network. As illustrated in FIG. 1, Internet service provider ISP generally includes multiplexer 26 to service multiple central offices CO, and router 28 by way of which user units 8 may be placed in connection with other Internet servers for communication of information therewith.

Figure 2:
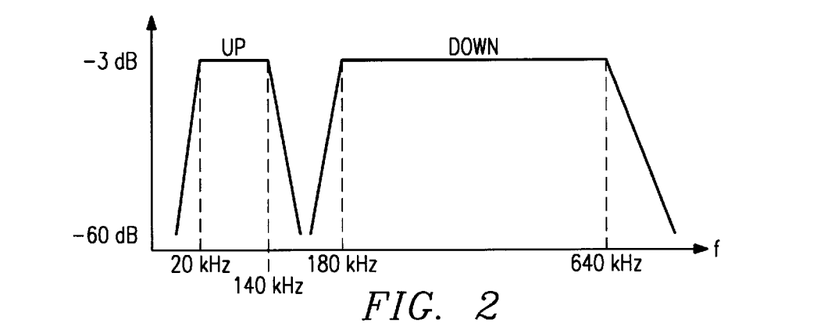
FIG. 2 is a plot of frequency versus signal amplitude, illustrating the frequency division multiplexing according to which the system of FIG. 1 operates according to the preferred embodiment of the present invention.

According to the preferred embodiment of the present invention, high-speed data communication from central office CO to home environment H over twisted pair wire facility TWP of limited length d is preferably accomplished by way of frequency division multiplexing (FDM). In this example, which will now be described relative to FIG. 2, so-called downstream communication from central office CO to home environment H is effected at high frequency, within bandwidth DOWN illustrated in FIG. 2. For example, as shown in FIG. 2, downstream bandwidth DOWN ranges from approximately 180 kHz to approximately 640 kHz. In contrast to the downstream transmission, upstream communication from home environment H to central office CO over twisted pair wire facility TWP is effected at lower frequency, within a lower frequency bandwidth UP (FIG. 2) which, in this example, ranges from approximately 20 kHz to approximately 140 kHz. The actual bandwidths illustrated in FIG. 2 are consistent with the so-called Medium Data Subscriber Line (MDSL) technology utilized in the preferred embodiment of the invention described herein; by way of reference, full ADSL communication occupies approximately twice the bandwidth illustrated in FIG. 2.

This frequency division between upstream and downstream communications is selected considering that most home and office users will be more frequently downloading larger blocks of information from the Internet via central office CO, relative to the amount of information (typically email) that these users will be uploading to the Internet. Recognition of these different uses and traffic requirements for upstream and downstream communication permits the division of the overall bandwidth in the manner illustrated in FIG. 2. As a result, modems 10, $20_k$ may readily communicate with one another, with such noise effects as echoes being readily filterable by simple bandpass filtering, given the wide disparity between upstream and downstream frequencies. For example, an upstream echo of downstream data will be at the higher, downstream, frequency when received at central office 20, thus permitting this echo to be easily filtered from the lower frequency signal. Additionally, the frequency division multiplexing illustrated in FIG. 2 also facilitates the filtering of near-end crosstalk (NEXT), in much the same manner as echo cancellation.

Figure 3:
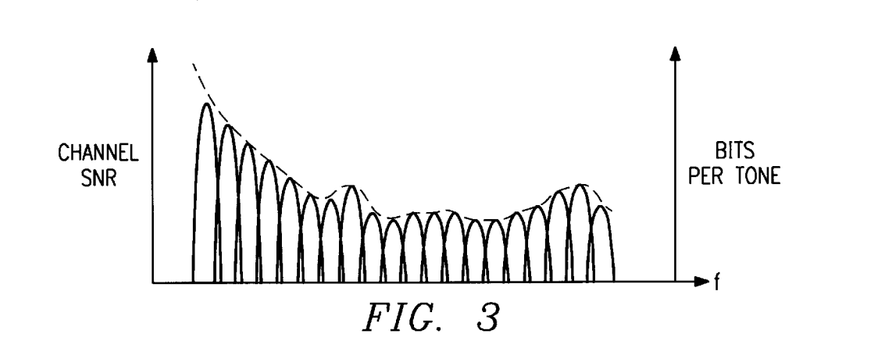
FIG. 3 is a plot of frequency versus signal-to-noise ratio, and potential bit loading, for each of multiple subchannels within the downstream transmission bandwidth in the plot of FIG. 2.

According to the preferred embodiment of the invention, the frequency division multiplexed communication is carried out by way of discrete multi-tone modulation (DMT), in which the bandwidth is uniformly divided into multiple bins, or subchannels, each having a relatively narrow bandwidth, for example 5 kHz. FIG. 3 illustrates an example of this division, for a portion of the downstream frequency bandwidth DOWN of FIG. 2. In the system of FIG. 1, the transmission characteristics of twisted pair wire facility TWP, as terminated at remote modem 10 and central office modem $20_k$, varies with frequency, such that each subchannel may have a different signal-to-noise ratio as illustrated in FIG. 3. According to the preferred embodiment of the present invention, the various subchannels are "loaded" to carry data at a wordwidth that depends upon their signal-to-noise ratio. In other words, subchannels having a higher signal-to-noise ratio are capable of carrying more bits than are subchannels with a poorer signal-to-noise ratio; as such, FIG. 3 illustrates that the number of "bits per tone" corresponds to the signal-to-noise ratio of the subchannels.

It is contemplated that the attenuation behavior of the system over frequency cannot generally be determined a priori, as this behavior is highly determined by characteristics of each individual installation, and thus does not necessarily follow a simple-order model. As such, upon establishing a connection, the transmitting portions of remote modem 10 and central office $20_k$ are set during the initialization procedure according to the preferred embodiment of the invention, as will be described in detail hereinbelow. This initialization procedure includes one modem sending a probe signal to determine the signal-to-noise ratio (SNR) of each frequency bin, and the receiving modem returning a signal, back to the transmitting modem, indicating the measurement result and the bit rate loading for each subchannel.

Figure 4:
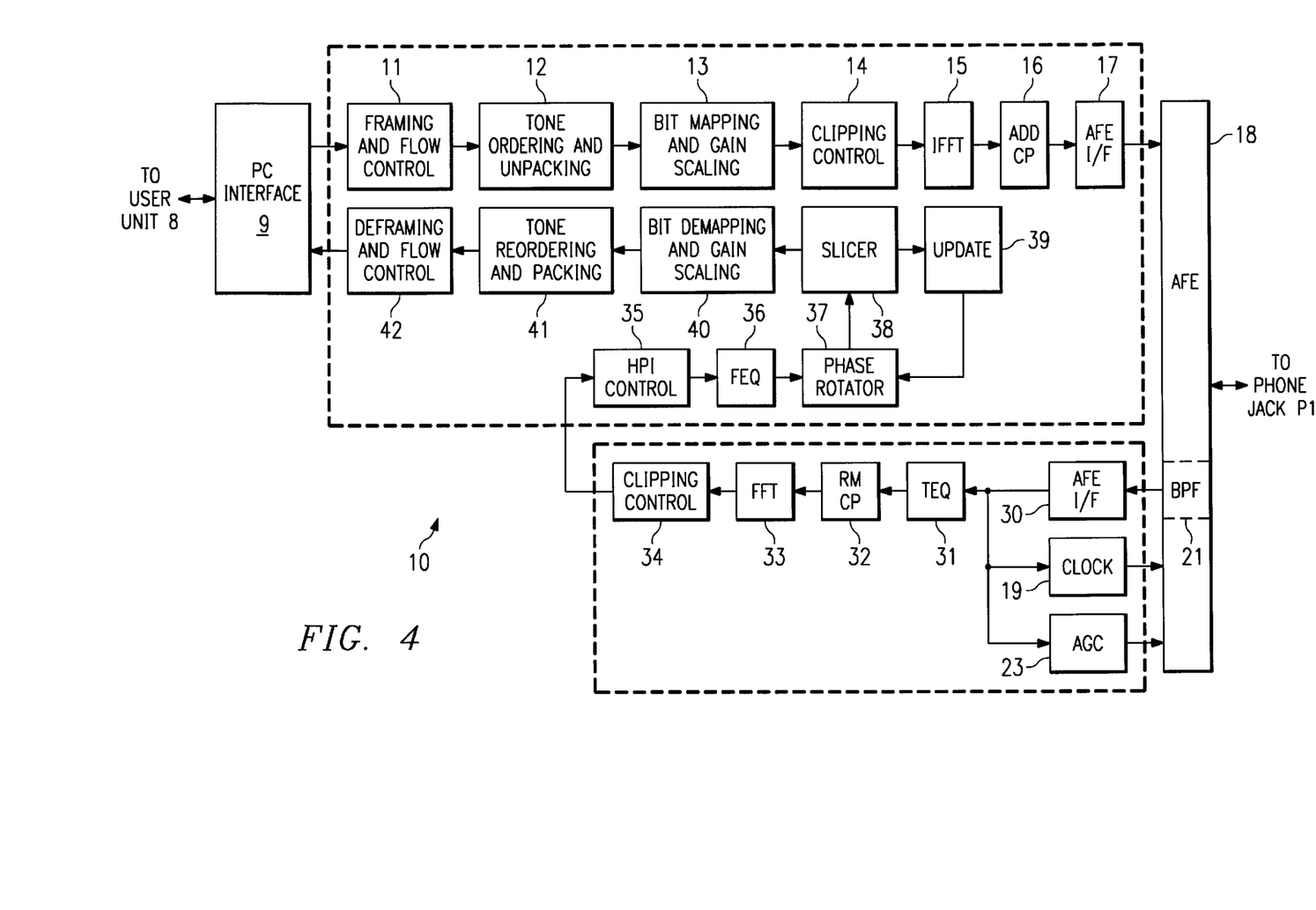
FIG. 4 is a block flow diagram illustrating the operating functions of the remote modem in the system of FIG. 1 in receiving and transmitting messages.

Referring now to FIG. 4, the functional construction and operation of remote modem 10 according to the preferred embodiment of the present invention will now be described in detail. As illustrated in FIGS. 1 and 4, remote modem 10 interfaces with user unit 8 over interface 9, and with phone jack PJ by way of analog front end (AFE) 18; bidirectional communication is thus effected by way of interfaces 9, 18, with transmit and receive paths disposed therebetween as will now be described. The functional blocks of FIG. 4 are processes that are preferably carried out by way of programmable hardware, as will be described in further detail hereinbelow, or alternatively by way of custom hardware for one or more of the specific functions.

On the transmit side, modem 10 receives digital data from user unit 8 via interface 9, and packets the data in a physical layer frame, which is then modulated to multiple DMT subcarriers, or subchannels, by way of an inverse Fast Fourier Transform (IFFT) process, for application to twisted pair wire facility TWP via phone jack PJ. Framing and flow control process 11 receives the digital data from interface 9, and buffers the data according to a positive flow control method in which modem 10 receives a reply from modem $20_k$ for a previously sent data packet prior to sending the next data packet. Preferably, framing and flow control process 11 formats each packet of data to include a header field in advance of the data for synchronization, and a circular redundant code (CRC) field following the data field to permit error detection.

By way of an aside, it is useful to transmit "dummy" data, such as a recurring scrambled pseudo-random sequence, over facility TWP when in an idle mode, in order to maintain synchronization between modems 10, $20_k$. This idle mode is particularly prevalent for the transmit side of remote modem 10, considering that most of the data communication between modems 10, $20_k$ will be in the downstream direction. In any case, modems 10, $20_k$ must be able to distinguish dummy data from actual data, preferably by way of the header field. These idle periods may also be used to actively check the SNR for various subchannels, in similar manner as during initialization. Additionally, if certain subchannels are found to be consistently unusable, framing and flow control process 11 can generate "stuffing" words to ensure that the bad subchannels are not used; the receiving modem must be aware of these bad subchannels, so that the stuffing words (which are themselves usually modified by the severe attenuation) are ignored.

According to the DMT approach, digital data is encoded to correspond to a point in an amplitude-phase "constellation". Discussion of the encoding of DMT data may be found in Cioffi, "A Multicarrier Primer", *Tutorial submitted to Standards Committee T1 of IEEE* (1991); Chow, et al., "A Discrete Multitone Transceiver System for HDSL Applications", *Journal on Selected Areas in Communications*, Vol. 9, No. 6 (IEEE, Aug. 1991), pp. 895–908; and Bingham, "Multicarrier Modulation for Data Transmission: An Idea Whose Time Has Come", *IEEE Communications Magazine* (May, 1990), pp. 5–14, all incorporated herein by this reference. As is known in this art, DMT associates each possible digital value (depending upon the bit loading for the particular subchannel or subcarrier) with an amplitude and phase combination. For example, if a subcarrier has been assigned to a bit loading of four, the constellation for that subcarrier includes sixteen possible amplitude-phase combinations, each associated with one of the sixteen possible digital values; if a subcarrier has been assigned to a bit loading of eight (which is the maximum according to the MDSL approach used in this embodiment of the invention), two-hundred fifty-six amplitude-phase combinations are present in the constellation, each associated with one of the two-hundred fifty-six possible digital values presented by the eight bits. The smaller constellations are preferably a subset of the largest (eight-bit) constellation, for ease of encoding. However, the less-populated constellations will have less power than the more heavily populated subchannels, and as such gain scaling of the subchannels is preferred to amplify the less-populated subchannels. Furthermore, it is preferred to encode subcarriers as a group, for efficiency of operation where modem 10 is implemented by way of a pipelined digital signal processor (DSP); this grouping combines multiple sub-carriers into 16-bit word units, such that each sub-carrier is confined within a word boundary. Some subcarriers will have their bit loading reduced by one or more bits as necessary to maintain this grouping. It is also preferred to pre-group subcarriers as part of the initialization process to generate a pre-stored macro of the subcarrier grouping, eliminating the need for conditional call and conditional branch operations in the DSP code.

In the flow of FIG. 4, the ordering of the received data according to subchannel and its unpacking is performed in process 12, while the mapping of the data into the constellation points within each subcarrier is performed as part of bit mapping and gain scaling process 13, preferably through use of a look-up table. Scaling of the amplitudes of the various subchannels is also carried out in process 13. The grouping and encoding of processes 12,13 effectively convert each of the data words into the frequency domain, as the output of process 13 is a sequence of amplitude and phase values (encoded by the constellations), with the order in the sequence corresponding to the frequency of the associated subchannels.

Clipping control process 14 and IFFT process 15 are then next performed to generate time-domain signals corresponding to the encoded subcarriers. IFFT process 15 in modem 10 thus generates thirty-two tones (for the relatively low frequency upstream signals) for this communication, preferably by a sixty-four tone IFFT in which the upper thirty-two tones are set to zero, providing better frequency cut-off. Clipping control process 14 is done prior to IFFT, simply by monitoring overflow flags in the status register of the DSP; upon detection of an overflow, process 14 sets certain bits (referred to as operation and maintenance bits (OAM) bits) plus a pilot tone, indicating that the transmitter is repairing the clipped frame over the next two frames; these two frames will be combined and decoded by the receiving modem $20_k$.

Following IFFT process 15, process 16 adds a circular prefix to interframe portions of the sequence as a guard time, which permits the time-domain equalizer filter of the receiving modem $20_k$ to have the appropriate impulse response, as will now be described. In a system such as illustrated in FIG. 1, the received transmission data over twisted pair wire facility TWP may be considered as a time-domain sequence of received data $y_n$, which corresponds to the transmitted data sequence $x_k$ convoluted with the impulse response $h_i$ of the transmission channel, as follows:

$$y_n = h_1 \otimes x_k$$

If one assumes that transmitted data sequence $x_k$ repeats every frame, the above linear convolution is the same as a circular convolution, in which case the application of a Fast Fourier Transform (FFT) to each side of the convolution provides a product in the frequency domain as follows:

$$Y_k = H_k \cdot X_k$$

or $$X_k = \frac{Y_k}{H_k}$$

in which case the transmitted data $X_k$ (and, in the time domain, $x_k$) is readily retrieved from received data $Y_n$ (or $y_n$).

However, in real transmission the data stream does not repeat itself every frame. As such, the frequency-domain product is not satisfied because data in a previous frame "leaks" into the current frame via IFFT process 15, thus creating inter-symbol interference (ISI). According to the preferred embodiment of the invention, process 16 adds a circular prefix by prepending the prefix to the data stream prior to transmission. This prefix corresponds to:

$$x_{-k} = x_{N-k} \text{ for } k=1 \text{ to } M$$

and is inserted prior to the first actual datum $x_0$. The size M of the circular prefix is selected to be longer than the channel impulse response, such that the circular convolution assumption may be met (i.e., the prefix is sufficiently long to prevent previous frame data from leaking into the current frame). As a result, the modified data stream appears to partially repeat itself.

The addition of the circular prefix requires that the receiving modem must remove $$y_{-k} \text{ for } k=1 \text{ to } M$$

from the received data stream prior to FFT processing of the received signal. Because the prefix size M is larger than the channel impulse response, the circular convolution assumption is effectively met, permitting demodulation to be performed in the frequency domain as noted above. Removal of the prefix is effected by way of time domain equalization (TEQ), as will be described below.

In this exemplary embodiment of the present invention, for transmission from remote modem 10 to central office modem $20_k$, the length of the circular prefix is sixteen points out of a sixty-four point IFFT. Process 17 interfaces the frame with analog front end 18, for transmission over twisted pair wire facility TWP via phone jack PJ.

On the receive side of remote modem 10, which receives and processes the high-frequency data communication from central office modem $20_k$ at subcarriers within the downstream bandwidth DOWN of FIG. 3, analog signals are received from twisted pair wire facility TWP via analog front end 18 and AFE interface 30. According to this embodiment of the invention, where frequency domain multiplexing is used to separate upstream and downstream communications, a sharp analog filter is implemented within analog front end 18, preferably by way of a relatively low cost elliptic analog filter 21. It is contemplated that this elliptic analog filter 21 violates T1.413 group delay requirements in the ADSL standard by introducing an impulse response that is longer than 250 $\mu$sec (as opposed to the 50 $\mu$sec limit under T1.413). However, the relatively low sampling rate used in this MDSL implementation permits implementation of a longer time domain equalization process to eliminate intersymbol interference that may be introduced by the extension of the channel impulse response by low-cost elliptic analog filter 21.

Clock recovery circuitry 19 in remote modem 10 is provided for purposes of synchronization, considering that central office modem $20_k$ provides the master clock in the system of FIG. 1. According to the preferred embodiment of the invention, clock recovery circuitry 19 includes a numerically controlled oscillator to track the clock signal synchronizing the communication over twisted pair wire facility TWP. Automatic gain control (AGC) process 23 maintains proper gain control at analog front end 18, in the conventional manner.

Time domain equalizer (TEQ) process 31 is provided in modem 10 to eliminate the intersymbol interference that is present, and particularly that which is introduced by analog filter 21 in analog front end 18 for separating the upstream and downstream traffic over twisted pair wire facility TWP. As will be described in further detail hereinbelow, the coefficients of TEQ process 31 are determined during initialization, as these coefficients depend upon the response of twisted pair wire facility TWP.

Figure 5:
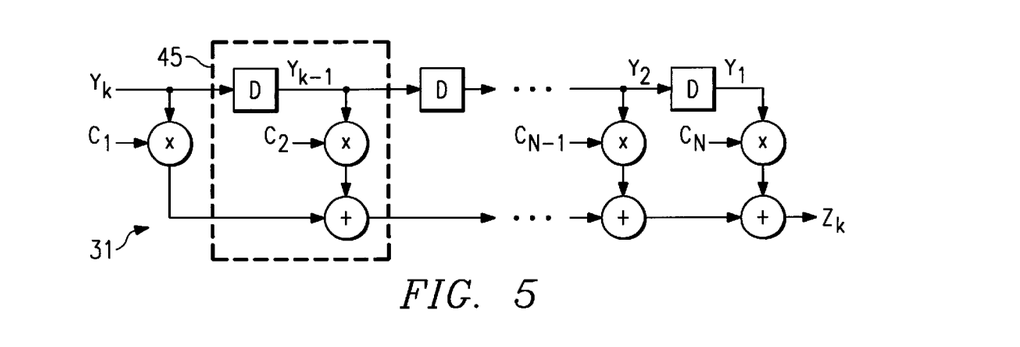
FIG. 5 is a representation of a time-domain equalizer (TEQ), realized by way of a finite impulse response (FIR) digital filter.

TEQ process 31 according to this embodiment of the invention is a conventional finite impulse response (FIR) filter that is implemented by way of a software routine performed by a digital signal processor (DSP). Particularly for the relatively long channel impulse response that is introduced by analog filter 21 in AFE 18, this FIR filter will require a relatively large number of "taps". FIG. 5 illustrates the implementation of an FIR filter in TEQ process 31. In this example, considering the input sequence to TEQ process 31 as $y_k$, one may express the filtered output $z_k$ as follows:

$$z_k = y_k c_1 + y_{k-1} c_2 + \ldots + y_2 c_{N-1} + x_1 c_N$$

where the sequence of coefficients c implement the desired filtering effect. As illustrated in FIG. 5, each tap 45 corresponds to a multiply-and-add operation, including a delay D for the received data value. The size N of TEQ process 31 thus corresponds to the number of taps 45 (plus one).

In this preferred embodiment of the invention, as noted above, because the channel impulse response is relatively long, requiring a relatively long circular prefix, the implementation of TEQ process 31 may require a relatively large number of DSP operations because of the relatively large number of taps 45. As a result, it is desirable to optimize the selection of the TEQ coefficients c during initialization, given that many solutions are permitted since TEQ process 31 does not invert the channel; this optimization preferably achieves the most effective channel impulse length reduction with a minimum number of TEQ taps 45. The selection of these TEQ coefficients c will be described in further detail hereinbelow relative to the initialization process.

Following the intersymbol interference filtering of TEQ process 31, modem 10 applies process 32 to the bitstream to eliminate the circular prefixes. Fast Fourier Transform (FFT) process 33 performs a 256-point FFT to account for the 128 tones used in the high-frequency downstream transmission received by remote modem 10. Clipping control process 34 restores any words that were separated in transmission due to overflow, as noted above, and the resultant frequency-domain sequence is applied to host processor interface (HPI) control process 35, if remote modem 10 is realized as multiple processors.

Frequency domain equalizer (FEQ) process 36 is then performed to flatten the signal spectrum of the received sequence, and to compensate for phase distortion; phase rotator process 37 tracks relatively small variations of the channel. The filtered signals are applied to slicer 38 which performs the hard decoding of the constellation; errors in this process are received by update process 39, which updates the coefficients in FEQ process 36. Bit demapping and gain scaling process 40, tone reordering and packing process 41, and deframing and flow control process 42, perform the inverse of the transmission sequence of processes 11, 12, 13, resulting in a digital word that is applied to user unit 8 via interface 9.

Figure 6:
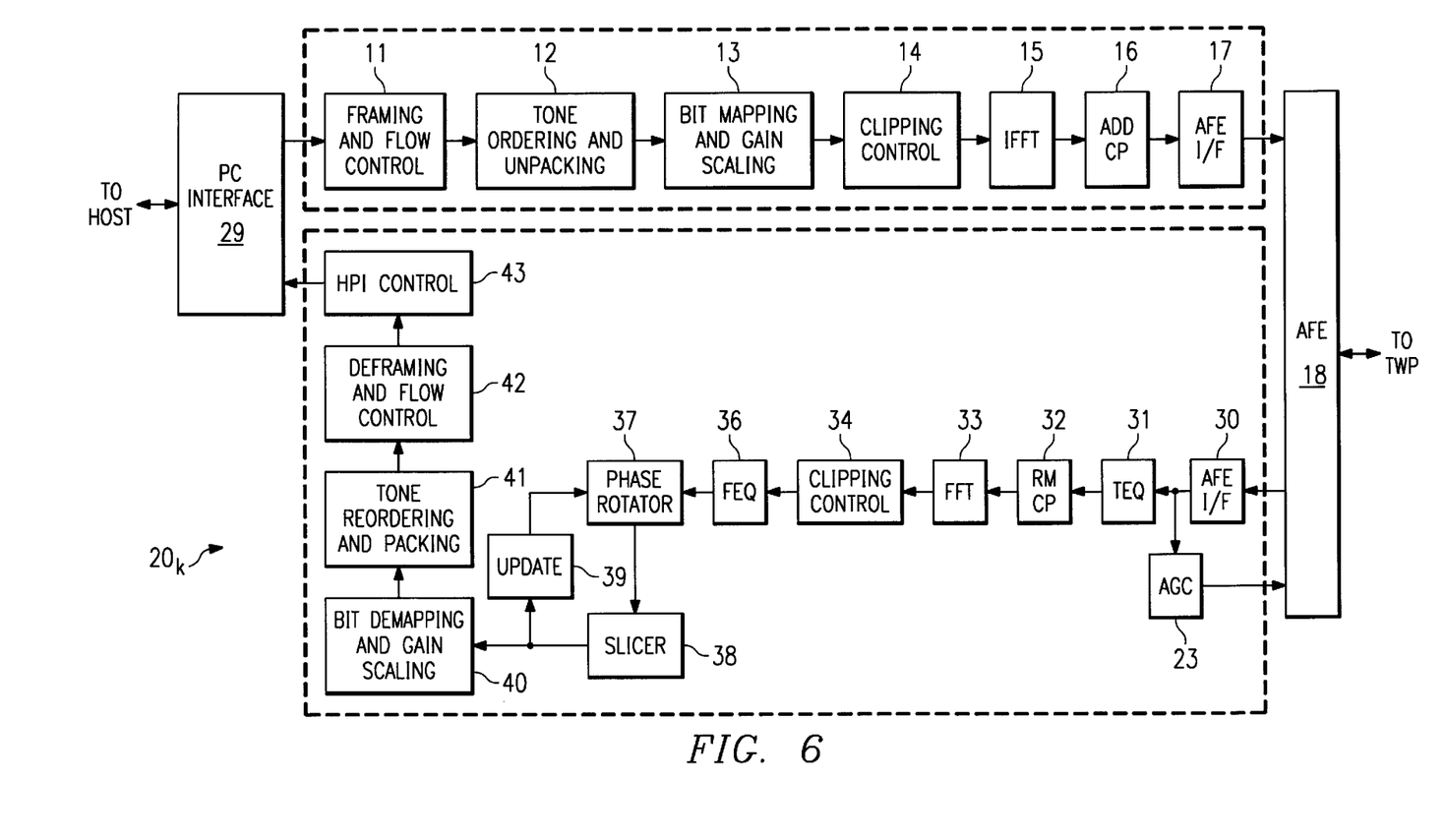
FIG. 6 is a block flow diagram illustrating the operating functions of the central office modem in the system of FIG. 1 in receiving and transmitting messages.

Referring briefly now to FIG. 6, the functional construction and operation of central office modem $20_k$ will now be described. Modem $20_k$ includes analog front end (AFE) 18 which, in this case, is connected to twisted pair wire facility TWP either directly or through a switch. Interface 29 of modem $20_k$ is connected to a host computer (not shown) that is within ADSL bank 20 or within router 22, dependent upon the architecture of central office CO (FIG. 1).

Similar processes in modem $20_k$ as in remote modem 10 are indicated by the same reference numeral, it of course being understood that the transmission side of central office modem $20_k$ operates at high frequency (corresponding to the downstream bandwidth DOWN of FIG. 2), and that the receiving side of central office modem $20_k$ operates at low frequency (corresponding to the upstream bandwidth UP of FIG. 2). As such, IFFT process 15 performs a 256 point (128 tone) IFFT, while FFT process 33 performs a 64-point (32 tone) FFT on the receive side.

In addition, central office modem $20_k$ varies from remote modem 10 in that the receive side does not include clock recovery circuitry, since central office modem $20_k$ itself generates the master clock signal in this synchronous transmission. Additionally, on the receive side, HPI control process 43 is performed after deframing and flow control process 42, as shown in FIG. 6, if central office modem $20_k$ is realized as multiple processors.

Figure 7:
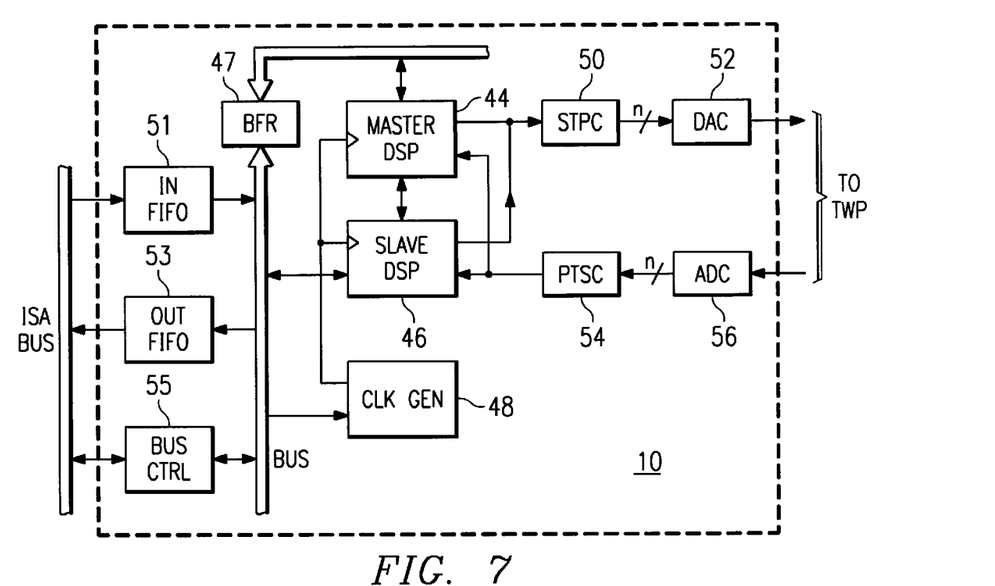
FIG. 7 is an electrical diagram, in block form, of a remote modem constructed according to the preferred embodiment of the present invention.

FIG. 7 illustrates the general construction of remote modem 10 according to one example of the preferred embodiment of the invention. As illustrated in FIG. 7, modem 10 includes two digital signal processors (DSPs) 44, 46, arranged in a master/slave fashion, such that slave DSP 46 is available to execute certain operations, such as FFTs and digital filtering, under the control and direction of master DSP 44. This master/slave arrangement is particularly suitable where DSPs 44, 46 are of modest performance; alternatively, a single high-performance DSP, such as of the TMS320C6x class, is capable of performing all of the DSP functions in remote modem 10. In this example of FIG. 7, master DSP 44 and slave DSP 46 can each transmit signals to twisted pair wire facility TWP via serial-parallel conversion circuit 50, which in turn presents an n-bit digital word to digital-to-analog converter (DAC) 52 for application to twisted pair wire facility TWP. Conversely, master DSP 44 and slave DSP 46 can each receive signals from twisted pair wire facility TWP via analog-to-digital converter (ADC) 56 and parallel-serial conversion circuit 54. Modem 10 includes clock generation circuitry 48 for generating the internal clocks within modem 10, including clock recovery as described hereinabove.

On the host interface side of modem 10, DSPs 44, 46 are connected to bus BUS (including via buffer 47, which is provided if necessary to translate voltage levels between DSPs 44, 46). Bus BUS is also connected to input and output FIFO memories 51, 53, respectively, through which data is communicated to bus ISA BUS, which is the main bus of the host computer (e.g., user unit 8 for modem 10). This communication is controlled by way of bus control circuitry 55, which resides on both of buses ISA BUS and BUS.

While the construction of remote modem 10 is illustrated in FIG. 7, it is contemplated that central office modem $20_k$ may be similarly constructed, if desired, considering that the functions performed thereby are quite similar, as described hereinabove. It is also contemplated that the initialization process according to the preferred embodiment of the invention, as will now be described in detail, may readily be executed by modems 10, $20_k$ constructed in the manner illustrated in FIG. 7.

Figure 8:
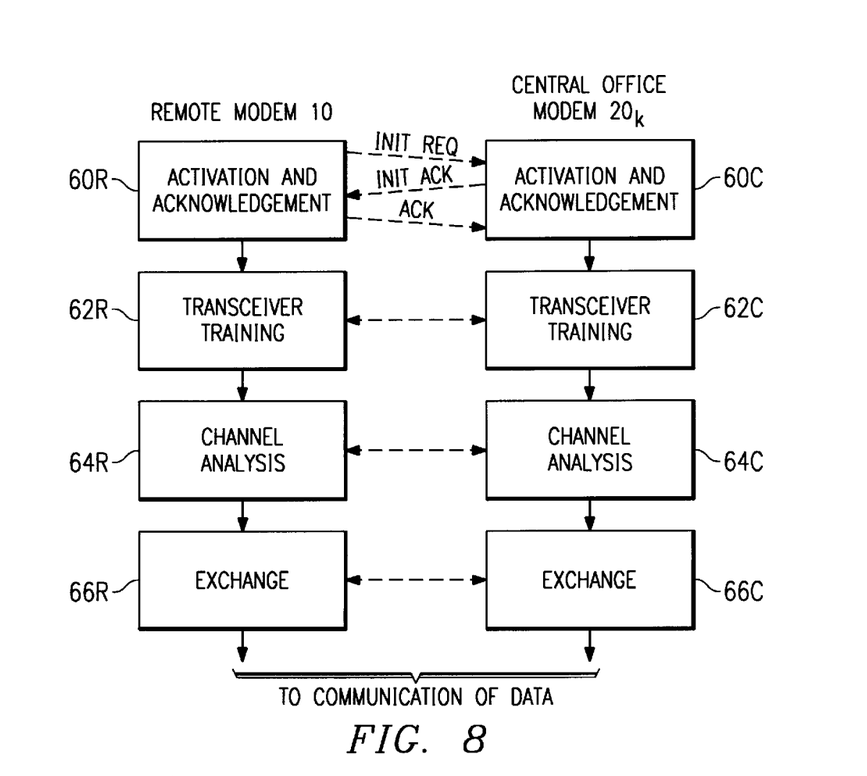
FIG. 8 is a flow chart illustrating the operation of the initialization sequence executed by a remote modem and a central office modem according to the preferred embodiment of the present invention.

Referring now to FIG. 8, the initialization process of modems 10, $20_k$ according to the preferred embodiment of the invention will now be described in detail. FIG. 8 illustrates this process by way of parallel flow diagrams, one for each of modems 10, $20_k$. At each stage of the process, modems 10, $20_k$ communicate with one another in accomplishing each step, as will now be described.

As illustrated in FIG. 8, initialization begins with remote modem 10 executing activation and acknowledgment process 60R, and central office modem $20_k$ executing activation and acknowledgment process 60C. Activation and acknowledgment processes 60, in this embodiment of the invention, are quite similar to the activation and acknowledgment routines performed in conventional ADSL modem systems. Upon power-up, remote modem 10 issues an initialization request over twisted pair wire facility TWP to central office modem $20_k$, for example by issuing a single sinusoid signal at a specific frequency, for example 34.5 kHz. Upon receipt of this initialization request, central office modem $20_k$ issues an acknowledgment signal to remote modem 10 over twisted pair wire facility TWP; this signal may also be a single sinusoid signal at a specific frequency, for example 207 kHz. Remote modem 10, upon receipt of the acknowledgment signal from central office modem 201, next issues a signal indicating both its receipt of the acknowledgment, and also indicating its modem type. As described hereinabove, remote modem 10 according to this operation operates according to an MDSL configuration, and instructs central office modem $20_k$ of this mode by issuing another sinusoidal signal at a specific frequency, for example 60.375 kHz, to indicate the MDSL mode.

Each of remote modem 10 and central office modem $20_k$ are then ready to enter transceiver training processes 62R, 62C, respectively, as will now be described in detail relative to FIG. 9. In transceiver training processes 62R, 62C, modems 10, $20_k$ will generally alternate in the "training" of their TEQ and FEQ processes. In this example the number of taps in each of these FIR digital filters is preselected, so training processes 62R, 62C determine the values of the coefficients c in these filters. Training processes 62R, 62C are intended to optimize particularly the implementation of TEQ filters 13, preferably by minimizing the number of taps 45 (FIG. 5) necessary to achieve the desired level of intersymbol interference.

Figure 9:
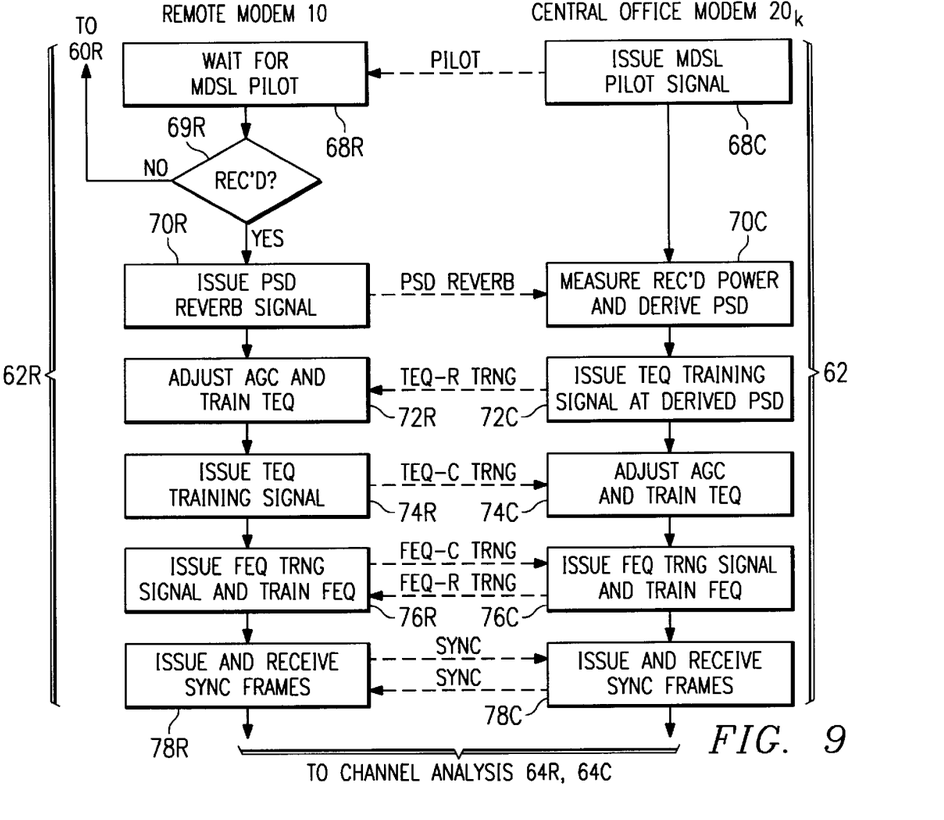
FIG. 9 is a flow chart illustrating the operation of the transceiver training processes executed by a remote modem and a central office modem in the initialization sequence of FIG. 8 according to the preferred embodiment of the present invention.

As shown in FIG. 9, remote modem 10 enters process 68R, in which it waits for receipt of an MDSL pilot signal from central office modem $20_k$. Assuming that central office modem $20_k$ was successfully initialized in process 60C, central office modem $20_k$ issues a pilot signal over twisted wire pair facility TWP. According to the preferred embodiment of the invention, this pilot signal is a single frequency sinusoid at a selected pilot frequency (e.g., 276 kHz), at a selected power level (e.g., 4 dBm), for a selected duration (e.g., 512 symbols). This pilot signal serves as an acknowledgment that central office modem $20_k$ detected the acknowledgment signal produced by remote modem 10 in process 60R. Referring back to remote modem 10, decision 69R is performed after a specified time; control returns back to process 60R for reinitialization if remote modem 10 does not detect the pilot signal. Upon receipt of the pilot signal (decision 69 is YES), remote modem 10 initiates process 70R.

In process 70R, remote modem 10 applies a signal (PSD REVERB) to twisted pair wire facility TWP that central office modem $20_k$ uses to calculate the power spectrum density (PSD) that it is to use in its transmission. In this example, the PSD REVERB signal is based upon a pseudo-random upstream sequence $d_n$, for n=1 to 80, and defined as:

$$d_n = 1 \quad \text{for } n = 1 \text{ to } 11$$
$$d_n = d_{n-5} \oplus d_{n-6} \text{ for } n = 12 \text{ to } 74$$
$$d_n = 1 \quad \text{for } n = 75 \text{ to } 80$$

This sequence repeats itself every frame, and is processed by the transmit side of modem 10 in the manner illustrated in FIG. 4, except that the resulting time domain binary signal is mapped from the sequence $d_n$ without modulation, to produce PSD REVERB signal $y_n$. This mapping "flips" every two frames so that:

$$\text{sgn}(y_n) = \begin{cases} \text{sgn}(2d_n - 1), & \text{for frames 0, 1} \\ \text{sgn}(-2d_n + 1), & \text{for frames 2, 3} \end{cases}$$

This signal repeats every four frames, at a period of 1024 symbols, and is transmitted at the maximum permitted PSD of −40 dBm/Hz.

Also during process 70R, remote modem 10 preferably measures the echo path of signal PSD REVERB, and trains its pseudo echo cancellation process in analog front end 18 and AFE interface 30.

Central office modem $20_k$ performs process 70C upon receipt of signal PSD REVERB, in particular to calculate the PSD that it is to use in its downstream transmission to remote modem 10. This is accomplished by central office modem $20_k$ determining the received power of signal PSD REVERB, using the advance knowledge that the transmitted signal was at a PSD of −40 dBm/Hz. In particular, central office modem $20_k$ determines an overall received power level for signal PSD REVERB over the 1024 symbol duration, which may range from 3 to 9 dBm. Upon determining the received power level, central office modem $20_k$ then initiates process 72C, in which central office modem $20_k$ issues a TEQ training signal over twisted pair wire facility TWP to remote modem 10, at a power spectrum density (PSD) that corresponds to the received power level in process 70C.

Before describing the nature of the TEQ training signal issued in process 72C, the power at which this signal is produced is set by central office modem $20_k$ in process 72C based upon the received upstream power of signal PSD REVERB. According to this exemplary embodiment of the present invention, this relationship is as follows:

| Upstream received power (dBm) | 3 | 4 | 5 | 6 | 7 | 8 | 9 |
|---|---|---|---|---|---|---|---|
| Maximum downstream PSD (dBm/Hz) | −40 | −42 | −44 | −46 | −48 | −50 | −52 |

This adjustment of the PSD for downstream communications thus accounts for the attenuation that may be encountered generally over twisted pair wire facility TWP, to ensure that the maximum power spectrum density threshold is not violated.

According to the preferred embodiment of the present invention, and referring back to FIG. 5, the coefficient sequence c in TEQ process 31 as carried out by remote modem 10 (and, conversely, as carried out by central office modem $20_k$ for upstream traffic) are not adapted during communications, and as such must be determined during initialization. As noted above, TEQ process 31 is intended primarily to reduce the channel impulse response including the effect of analog band pass filtering effected by AFE 18, and is not intended to invert the channel data. As such, multiple solutions exist for the coefficient sequence c. In order to improve the efficiency of modem 10, implemented according to a DSP system as described above relative to FIG. 7, the preferred embodiment of the invention is intended to optimize channel impulse length reduction in combination with minimal taps 45. Conventional TEQ sequences, such as suggested by the T1.413 standard for ADSL communications, do not reliably converge upon a suitable solution.

According to the preferred embodiment of the invention, TEQ training is carried out by remote modem 10 in process 72R, responsive to the training signal issued by central office modem $20_k$ in process 72C, by considering random data blocks of length N, where N is the sum of the FFT length (in points) with the length M of the circular prefix inserted in transmission (processes 16). Preferably, the random data block repeats itself over time, with a polarity (or sign) alternating every two blocks:

| $\{x_n\}$ | $\{x_n\}$ | $\{-x_n\}$ | $\{-x_n\}$ | $\{x_n\}$ | $\{x_n\}$ |
|---|---|---|---|---|---|
| 0 | 1 | 2 | 3 | 4 | 5 |

This sequence of paired-alternating signed repeating blocks in the TEQ training signal is generated by central office modem $20_k$ in process 72C by way of a pseudo-random downstream data sequence $d_n$ for n=1 to 320, defined as:

$d_n = 1$     for $n = 1$ to 9

$d_n = d_{n-4} \oplus d_{n-9}$ for $n = 10$ to 304

$d_n = 1$     for $n = 305$ to 320

This sequence repeats itself every frame, and is processed by the transmit side of central office modem $20_k$ in the manner illustrated in FIG. 6, except that the resulting time domain binary signal is mapped from the sequence $d_n$ without modulation, to produce the TEQ training signal $y_n$. As described above, this mapping "flips" every two frames $$\text{sgn}(y_n) = \begin{cases} \text{sgn}(2d_n - 1), & \text{for frames 0, 1} \\ \text{sgn}(-2d_n + 1), & \text{for frames 2, 3} \end{cases}$$

This signal is mixed with the pilot time domain signal which, as noted above, is a single sinusoid at 276 kHz, and repeats every four frames. The PSD of the TEQ training signal is determined by the measured power of the PSD REVERB signal, as noted above.

In process 72R, remote modem 10 trains its TEQ process 31 by deriving the number of taps 45 and setting the values of the coefficient sequence c, for the TEQ FIR filter illustrated in FIG. 5. In addition, remote modem 10 adjusts its automatic gain control (AGC) process 23 to the appropriate level, in the conventional manner. Referring back to training of TEQ process 31, for ease of description, consider the received training signal prior to TEQ process 31 as $y_m[n]$ and after TEQ process 31 as $z_m[n]$, where m is the frame index (e.g., frames 0 through 5 as illustrated above). The sequence of TEQ taps 45 will be referred to as $w_1$ hereinbelow, and the channel impulse response (including that of TEQ 31) will be referred to as $h_k$.

One may readily express the output signals $z_m[n]$ on a frame-by-frame basis, based upon the random data blocks $x_n$, as follows:

Frame 1:

$$z_1[n] = \sum_{k=0}^{n} x_{n-k} \cdot h_k + \sum_{k=1}^{\infty} x_{N-k} \cdot h_{n+k} + p_n$$

Frame 2:

$$z_2[n] = -\sum_{k=0}^{n} x_{n-k} \cdot h_k + \sum_{k=1}^{\infty} x_{N-k} \cdot h_{n+k} + p_n$$

Frame 3:

$$z_3[n] = -\sum_{k=0}^{n} x_{n-k} \cdot h_k - \sum_{k=1}^{\infty} x_{N-k} \cdot h_{n+k} + p_n$$

Frame 4:

$$z_4[n] = \sum_{k=0}^{n} x_{n-k} \cdot h_k - \sum_{k=1}^{\infty} x_{N-k} \cdot h_{n+k} + p_n$$

Frame 5:

$$z_5[n] = z_1[n]$$

In this case, the signal $p_n$ refers to the pilot signal of the single sinusoid at 276 kHz, noted above. For each of the frames, the second summation term corresponds to the intersymbol interference from the previous frame, while the first summation term corresponds to the transmitted frame. The second summation term may be separated from the first by subtracting frame 1 from frame 4 as follows:

$$err[n] = z_4[n] - z_1[n] = -\sum_{k=1}^{\infty} x_{N-k} \cdot h_{n+k}$$

For a circular prefix of size M, as noted above, the ideal channel impulse response is:

$$h_k = \begin{cases} h_k & k < M \\ 0 & k \geq M \end{cases}$$

This condition is satisfied if taps $w_1$ are chosen so that err[n]=0 for $n \geq M-1$. This satisfying condition leads directly to a set of linear equations:

$$\begin{bmatrix} x_{N-1} & x_{N-2} & \cdots & \\ 0 & x_{N-1} & x_{N-2} & \\ 0 & 0 & x_{N-1} & \\ \vdots & & & \ddots \\ 0 & \cdots & & x_{N-1} \end{bmatrix} \begin{bmatrix} h_M \\ h_{M+1} \\ h_{M+2} \\ \vdots \end{bmatrix} = 0$$

For the training sequence described hereinabove, which is selected so that $x_{N-1} \neq 0$, the unique solution of the set of linear equations is $h_k=0$, for all $k \geq M$, which corresponds to the ideal channel impulse response of:

$$h_k = \begin{cases} h_k & k < M \\ 0 & k \geq M \end{cases}$$

In general, since we have defined the received training signal prior to TEQ process 31 as $y_m[n]$, and the TEQ taps as $w_1$, one may express the TEQ output signal $z[n]$ as follows:

$$z[n] = \sum_{k=0} y_{n-k} \cdot w_k$$

which permits rewriting the error equation err[n]=$z_4[n]$-$z_1[n]$ as follows:

$$err[n] = \sum_k (y_4[n-k] - y_1[n-k]) \cdot w_k$$

According to the preferred embodiment of the invention, taps $w_1$ are chosen so that err[n]=0 for $n \geq M-1$. This permits the values of taps $w_1$ (i.e., coefficients c in FIG. 5) to be derived iteratively by remote modem 10 in process 72R according to the following:

$$w_1[k+1] = w_1[k] - 2 \cdot \mu \cdot err[n] \cdot (y_4[n-1] - y_1[n-1]), \text{ for } n \geq M-1$$

The constant $\mu$ is a convergence constant, less than unity, that may be empirically set. According to the preferred embodiment of the present invention, the setting of the tap values $w_1$, which includes the number of taps 45 in the FIR filter as well as the value of the coefficients c in the representation of FIG. 5, is performed by one or both of DSPs 44, 46 in remote modem 10 executing a program to perform this iterative process until convergence.

Figure 10:
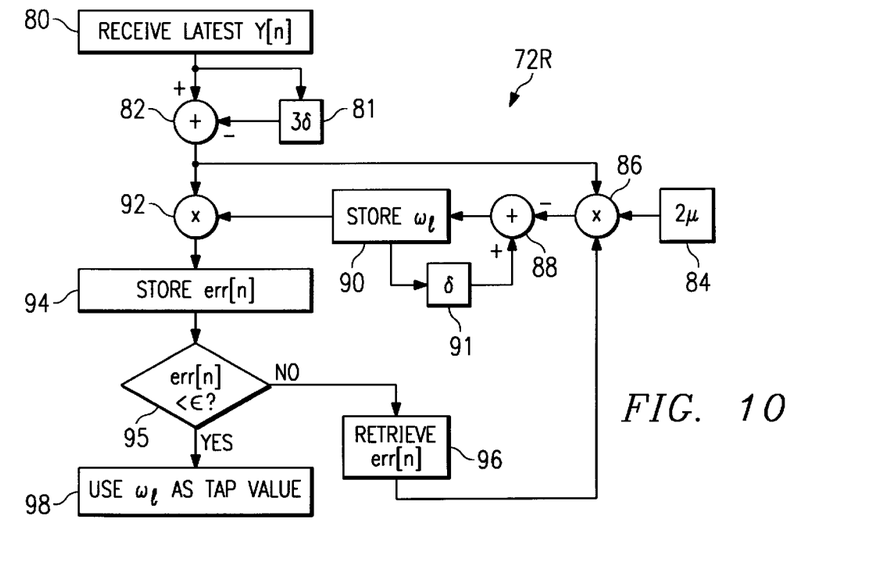
FIG. 10 is a flow diagram illustrating the operation of a remote modem in establishing one of the coefficient values in the time domain equalization filter, in the initialization sequence of FIG. 8 according to the preferred embodiment of the present invention.

Referring now to FIG. 10, an example of the operation of process 72R will be described in detail. The example illustrated in FIG. 10 is shown for the determination of a single tap coefficient value $w_1$, and will be repeated for each value $w_1$ of the series of coefficients c. As noted above, process 72R is performed by one or both of DSPs 44, 46 in remote modem 10.

For a given coefficient $w_1$, process 72R begins with process 80, in which the latest training signal sample y[n] is received by remote modem 10, and serves as value $y_4[n]$. This value y[n] is added, in addition process 82, with the complement of a previously received value of y[n], delayed by three sample periods by delay stage 81. As such, the result of addition process 82 corresponds to the difference:

$$y_4[n] - y_1[n]$$

used in deriving error value err[n] as noted above. This difference is applied to one input of multiply process 92, and also to one input of multiply process 86. Multiply 86 multiples the difference from process 82 by twice the convergence constant $\mu$ (retrieved in process 84) and by the previous value of the error value err[n] (retrieved in process 96, as will be noted below). As such, the result of multiply process 86 corresponds to:

$$2 \cdot \mu \cdot err[n] \cdot (y_4[n-1] - y_1[n-1])$$

where the term n−1 corresponds to the current value of $w_1$ that is being determined.

The complement of the result of multiply process 86 is applied as one input to addition process 88, the other input of which is the prior value of coefficient $w_k$, delayed by delay stage 91 from process 90. The sum derived in process 88 is stored as the current value of Wk, and thus corresponds to:

$$w_1[k+1] = w_1[k] - 2 \cdot \mu \cdot err[n] \cdot (y_4[n-1] - y_1[n-1])$$

as noted above. This current value $w_1[k+1]$ is then multiplied by the difference from process 82, in process 92, to determine the current value of err[n] according to the definition of error value err[n] given above; this current value of err[n] is stored in memory, in process 94.

In decision 95, the current error value err[n] is compared against threshold value $\epsilon$. If current error value err[n] exceeds this threshold $\epsilon$ (decision 95 is NO), then this current error value err[n] is retrieved in process 96 and applied to multiply 86 for the next received training signal y[n] as noted above. Upon the current error value err[n] being below the threshold value $\epsilon$ (decision 95 is YES), the current iterated coefficient value $w_1$ stored in process 90 is then to be used as the TEQ tap value, as indicated in process 98 of FIG. 10. This process 72R is, as noted above, repeated to define each tap coefficient value $w_1$ for use in the TEQ FIR filter.

In performing process 72R, it will be noted that if the frame within each training sequence is much longer than the channel impulse response, err[n] approaches zero at the end of Frame 4. However, when the repeated Frame 0 is received as Frame 5, $$err[n] = z_5[n] - z_2[n] = \sum_{k=0}^{n} x_{n-k} \cdot h_k$$

such that the amplitude of err[n] begins to increase at frame boundary n=0. This rising edge may be used for frame synchronization.

Following process 72R, remote modem 10 then performs process 74R in which it generates a TEQ training signal to central office modem $20_k$. The TEQ training signal generated by remote modem 10 is identical to that generated by remote modem 10 in process 70R as signal PSD REVERB. In process 74C, central office modem $20_k$ receives this TEQ training signal, adjusts its AGC process 23 in the conventional manner, and trains taps $w_1$ in its TEQ process 31 in the same manner as performed by remote modem 10, described hereinabove relative to process 72R.

Following the completion of process 74C, central office modem $20_k$ initiates process 76C, in which central office modem $20_k$ issues a frequency equalization (FEQ) training signal to remote modem 10. This FEQ training signal is based upon a data sequence of:

$$d_n = 1 \quad \text{for } n = 1 \text{ to } 9$$

$$d_n = d_{n-4} \oplus d_{n-9} \quad \text{for } n = 10 \text{ to } 256$$

which repeats every frame, for a duration of 4096 frames. This sequence $d_n$ is mapped into a four-point quadrature amplitude modulation (QAM) constellation, with mapping polarities alternating every frame as follows:

|  | sgn($X_i$) | sgn($Y_i$) |
|---|---|---|
| for odd frames | sgn($2d_{2i} - 1$) | sgn($2d_{2i+1} - 1$) |
| for even frames | sgn($-2d_{2i} + 1$) | sgn($-2d_{i+1} + 1$) |

The transmission PSD for this training signal is, again, −40 dBm/Hz.

This FEQ training signal is received by remote modem 10 in process 76R. Also during process 76R, remote modem 10 issues an FEQ training signal to central office modem $20_k$ over the upstream bandwidth, with the signal defined by a data sequence $d_n$ derived as:

$$d_n = 1 \quad \text{for } n = 1 \text{ to } 6$$

$$d_n = d_{n-5} \oplus d_{n-6} \quad \text{for } n = 7 \text{ to } 64$$

which repeats every frame, for a duration of 4080 frames. This sequence $d_n$ is mapped into a four-point quadrature amplitude modulation (QAM) constellation as follows:

| sgn($X_i$) | sgn($Y_i$) |
|---|---|
| sgn($2d_{2i} - 1$) | sgn($2d_{2i+1} - 1$) |

The transmission PSD for this training signal is, again, −40 dBm/Hz.

During processes 76C, 76R, central office modem $20_k$ and remote modem 10 also respond to the FEQ training signals that each receive, and set the taps and coefficients in their respective FEQ processes to properly filter the received signals. According to the preferred embodiment of the invention, the FEQ filters are equalizers with a single, complex, tap, as are known in the art.

Following processes 76R, 76C, remote modem 10 and central office modem $20_k$ each execute synchronization processes 78R, 78C, respectively. Synchronization processes 78R issues a pair of synchronization frames with inverse polarity, namely:

| sgn($X_i$) | sgn($Y_i$) |
|---|---|
| sgn($-2d_{2i} + 1$) | sgn($-2d_{2i+1} - 1$) | to central office modem $20_k$. Simultaneously, central office modem $20_k$ issues two consecutive frames with polarity corresponding to odd frame polarity in the FEQ training signal issued in process 76C. These synchronization frames serve to synchronize the polarity of the frequency equalizer processes 36 in each of modems 10, $20_k$ relative to one another.

Following the completion of processes 78R, 78C, remote modem 10 and central office modem $20_k$ exit transceiver training processes 62R, 62C, respectively, (see FIG. 8) and begin channel analysis processes 64R, 64C, respectively. Channel analysis processes 64R, 64C each involve modems 10, $20_k$ sending a known sequence of signals to the other, according to which each receiving modem 10, $20_k$ then determines the signal-to-noise ratio (SNR) for each of the subchannels within the upstream and downstream bandwidth, as the case may be. A detailed description of channel analysis processes 64R, 64C is provided in copending application Ser. No. 60/033,429, filed Dec. 23, 1996, entitled "Bit Loading and Rate Adaptation on DMT MDSL", commonly assigned herewith and incorporated herein by this reference.

In general, processes 64R, 64C are performed by generating a generic bit mapping table for the maximum size constellation, and also a look-up table of gain factors for the gain by which smaller constellation modulation is amplified in order to maintain a constant power spectrum density. These gain factors are to be applied to the symbols prior to transmission. In the channel analysis processes 64R, 64C, modems 10, $20_k$ each measure the variances of noise on each tone, or subcarrier, according to which the SNR may be derived for each subcarrier. Upon determination of the SNR for each subcarrier, or tone, processes 64R, 64C each sort and table the tones in ascending order of gain factor and thus according to bit capacity, and group the tones into blocks, for example into blocks that can convey a sixteen-bit capacity; some tones may require downgrading of their bit capacity in order to fit into a group. Following this grouping, processes 64R, 64C each then generate a bit-loading macro according to which the grouping and transmission of signals may be performed by DSPs 44, 46 (FIG. 7) without requiring conditional calls and conditional branches.

In processes 66R, 66C, each of modems 10, $20_k$ then communicate the results of their own channel analysis processes 64R, 64C to the other modem $20_k$, 10. Each of modems 10, $20_k$ are then aware of the bit loading determined by the receiving modems, and arrange their transmission parameters accordingly, as described in the above-incorporated copending application Ser. No. 60/033,429. Modems 10, $20_k$ are then ready to perform actual communication of real traffic, as illustrated in FIG. 8.

According to the preferred embodiment of the invention, the method of initializing and training the transceivers in modems 10, $20_k$ in an MDSL system, particularly in training the time-domain equalizer filters, provides important benefits in achieving the goals of low-cost, high-performance, modem communication over twisted pair wire facilities TWP. In particular, the ability to optimize the TEQ filters through their training during initialization enables the use of low cost analog band pass filters in the analog front ends of the modems, despite the long impulse response which such filters present to the system. The TEQ filters, once properly initialized in this manner, are able to filter out the long circular prefixes that are prepended to the transmitted frames, eliminating intersymbol interference in a relatively efficient manner, and in a way that may be readily implemented by modern DSP integrated circuits.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of initializing modem communications between first and second modems over a communications facility, comprising the steps of:

operating the first modem to issue an activation signal to the second modem over the communications facility;

operating the second modem to issue an acknowledgment signal to the first modem over the communications facility;

operating the second modem to issue a time-domain equalizer training signal to the first modem over the communications facility, the time-domain equalizer training signal comprising a repeating sequence of pseudo-random blocks of data; and operating the first modem to set a plurality of time-domain equalizer tap values responsive to the received pseudo-random blocks of data in the time-domain equalizer training signal by, for each of the plurality of time-domain equalizer tap values:

generating a difference signal between a current pseudo-random block of data and a previously received pseudo-random block of data;

generating a current error value from a combination of the difference signal, a current value of the time-domain equalizer tap value, and a previous error value;

updating the time-domain equalizer tap value using the current error value; and repeating the generating and updating steps until the current error value falls below a convergence threshold.

2. The method of claim 1, further comprising, after the step of operating the first modem to set a plurality of time-domain equalizer tap values:

operating the first modem to issue upstream communications to the second modem over the communications facility at frequencies over a first bandwidth; and operating the second modem to issue downstream communications to the first modem over the communications facility at frequencies over a second bandwidth, the second bandwidth including frequencies that are higher than frequencies in the first bandwidth.

3. The method of claim 2, wherein the downstream communications comprise a plurality of frames in quadrature amplitude modulation format, each of the plurality of frames including a circular prefix followed by communications data.

4. The method of claim 3, further comprising:

responsive to the receiving downstream communications, operating the first modem to perform the operations of:

applying an analog filter to the received downstream communications, the analog filter arranged so as to pass signals in the second bandwidth and to substantially reject signals in the first bandwidth; and applying a time-domain equalizer filter having a plurality of taps with values set in the step of operating the first modem to set a plurality of time-domain equalizer tap values, so as to substantially reject circular prefixes from the plurality of frames in the downstream communications.

5. The method of claim 1, wherein the communications facility comprises a twisted pair wire facility.

6. The method of claim 1, further comprising, after the step of operating the first modem to set a plurality of time-domain equalizer tap values:

operating the first modem to issue upstream communications in quadrature amplitude modulation format to the second modem over the communications facility at frequencies at a plurality of subcarrier frequencies over a first bandwidth; and operating the second modem to issue downstream communications in quadrature amplitude modulation format to the first modem over the communications facility at frequencies at a plurality of subcarrier frequencies over a second bandwidth, the second bandwidth including frequencies that are higher than frequencies in the first bandwidth.

7. The method of claim 6, further comprising, after the step of operating the first modem to set a plurality of time-domain equalizer tap values and before the steps of operating the first and second modems to issue upstream and downstream communications, respectively:

operating the first and second modems to determine signal-to-noise ratios of each of the subcarrier frequencies in each of the first and second bandwidths; and operating the first and second modems to determine bit loading capacity in each of the subcarrier frequencies in each of the first and second bandwidths;

wherein the steps of operating the first and second modems to issue upstream and downstream communications communicate data in each of the subcarrier frequencies in each of the first and second bandwidths, respectively, at bit loadings equal to or less than the bit loading capacities determined in the step of operating the first and second modems to determine bit loading capacity.

8. A method of initializing a remote modem comprising a digital signal processor (DSP) to communicate with a central office modem over a communications facility, comprising the steps of:

issuing an activation signal to the central office modem over the communications facility;

receiving a time-domain equalizer training signal from the central office modem over the communications facility, the time-domain equalizer training signal comprising a repeating sequence of pseudo-random blocks of data; and operating the DSP according to an iterative convergence process and setting a plurality of time-domain equalizer tap values responsive to the received pseudo-random blocks of data in the time-domain equalizer training signal by, for:

each of the plurality of time-domain equalizer tap values:

generating a difference signal between a current pseudo-random block of data and a previously received pseudo-random block of data;

generating a current error value from a combination of the difference signal, a current value of the time-domain equalizer tap value, and a previous error value;

updating the time-domain equalizer tap value using the current error value; and repeating the generating and updating steps until the current error value falls below a convergence threshold.

9. The method of claim 8, further comprising:

before the step of receiving a time-domain equalizer training signal, receiving an acknowledgment signal from the central office modem over the communications facility;

then issuing a power spectrum density signal over the communications facility to the central office modem;

wherein the time-domain equalizer training signal is at a power spectrum density corresponding to the power at which the central office modem received the power spectrum density signal.

10. The method of claim 8, further comprising, after the step of setting a plurality of time-domain equalizer tap values:

issuing upstream communications to the central office modem over the communications facility at frequencies over a first bandwidth; and receiving downstream communications over the communications facility from the central office modem at frequencies over a second bandwidth, the second bandwidth including frequencies that are higher than frequencies in the first bandwidth.

11. The method of claim 10, wherein the downstream communications comprise a plurality of frames in quadrature amplitude modulation format, each of the plurality of frames including a circular prefix followed by communications data;

and further comprising:

applying an analog filter to the received downstream communications, the analog filter arranged so as to pass signals in the second bandwidth and to substantially reject signals in the first bandwidth; and applying a time-domain equalizer filter having a plurality of taps with values set in the step of setting a plurality of time-domain equalizer tap values, so as to substantially reject circular prefixes from the plurality of frames in the downstream communications.

12. The method of claim 8, wherein the communications facility comprises a twisted pair wire facility.

13. A modem for communicating over a communications facility, comprising:

a host interface for coupling the modem to a host computer;

an analog interface for coupling the modem to the communications facility, the analog interface including an analog bandpass filter; and data processing circuitry, coupled to the host interface and to the analog interface, and programmed to perform the operations of:

issuing an activation signal over the communications facility;

receiving a time-domain equalizer training signal over the communications facility, the time-domain equalizer training signal comprising a repeating sequence of pseudo-random blocks of data; and setting a plurality of time-domain equalizer tap values responsive to the received pseudo-random blocks of data in the time-domain equalizer training signal by executing a sequence of steps comprising, for each of the plurality of time-domain equalizer tap values:

generating a difference signal between a current pseudo-random block of data and a previously received pseudo-random block of data;

generating a current error value from a combination of the difference signal, a current value of the time-domain equalizer tap value, and a previous error value;

updating the time-domain equalizer tap value using the current error value; and repeating the generating and updating steps until the current error value falls below a convergence threshold.

14. The modem of claim 13, wherein the data processing circuitry is further programmed to perform the operations of:

before the step of receiving a time-domain equalizer training signal, receiving an acknowledgment signal over the communications facility;

then issuing a power spectrum density signal over the communications facility;

wherein the time-domain equalizer training signal is received at a power spectrum density corresponding to the power at which a receiver received the power spectrum density signal.

15. The modem of claim 13, wherein the data processing circuitry is further programmed to perform, after the step of setting a plurality of time-domain equalizer tap values, the operations of:

issuing upstream communications over the communications facility at frequencies over a first bandwidth; and receiving downstream communications over the communications facility at frequencies over a second bandwidth, the second bandwidth including frequencies that are higher than frequencies in the first bandwidth.

16. The modem of claim 15, wherein the downstream communications comprise a plurality of frames in quadrature amplitude modulation format, each of the plurality of frames including a circular prefix followed by communications data;

wherein the received downstream communications are filtered by the band pass filter so as to pass signals in the second bandwidth and to substantially reject signals in the first bandwidth;

and wherein the data processing circuitry is further programmed to perform the operation of:

applying a time-domain equalizer filter having a plurality of taps with values set in the step of setting a plurality of time-domain equalizer tap values, so as to substantially reject circular prefixes from the plurality of frames in the downstream communications.

17. The modem of claim 13, wherein the communications facility comprises a twisted pair wire facility.

18. The modem of claim 13, wherein the data processing circuitry comprises at least one digital signal processor;

and wherein the operation of setting a plurality of time-domain equalizer tap values comprises operating the at least one digital signal processor according to an iterative convergence process.

* * * * *